(12) United States Patent
Yoshimura et al.

(10) Patent No.: US 7,259,902 B2
(45) Date of Patent: Aug. 21, 2007

(54) REFLECTIVE LIGHT CONTROL ELEMENT WITH DIFFUSIBLE REFLECTING SURFACE

(75) Inventors: Kazuki Yoshimura, Aichi (JP); Masahisa Okada, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 354 days.

(21) Appl. No.: 11/079,345

(22) Filed: Mar. 15, 2005

(65) Prior Publication Data

US 2005/0206990 A1 Sep. 22, 2005

(30) Foreign Application Priority Data

Mar. 17, 2004 (JP) ............................. 2004-075579

(51) Int. Cl.
*G02F 1/03* (2006.01)
*G02F 1/153* (2006.01)
(52) U.S. Cl. ................ 359/241; 359/244; 359/267
(58) Field of Classification Search .............. 359/244, 359/267, 318, 277, 241
See application file for complete search history.

(56) References Cited

U.S. PATENT DOCUMENTS

| | | | |
|---|---|---|---|
| 5,212,596 A * | 5/1993 | Andrus | 359/614 |
| 6,326,723 B1 * | 12/2001 | Raj et al. | 313/461 |
| 6,762,871 B2 | 7/2004 | Yoshimura | |
| 7,094,452 B2 * | 8/2006 | Yamashita et al. | 428/1.3 |

FOREIGN PATENT DOCUMENTS

JP 2003-335553 11/2003

OTHER PUBLICATIONS

J.N. Huiberts, et al., "Yttrium and Lanthanum Hydride Films with Switchable Optical Properties", Nature, vol. 380 (1996), pp. 231-234.
T.J. Richardson, et al., "Switchable Mirrors Based on Nickel-Magnesium Films", Appl. Phys. Lett., vol. 78, No. 20 (2001), pp. 3047-3049.

* cited by examiner

*Primary Examiner*—Scott J. Sugarman
*Assistant Examiner*—DaWayne A Pinkney
(74) *Attorney, Agent, or Firm*—Oblon, Spivak, McClelland, Maier & Neustadt, P.C.

(57) ABSTRACT

A reflective photochromic element having a diffuse reflective surface is provided. A diffuse reflection type photochromic element has a transparent thin film having surface irregularities formed on a transparent base and a reflective photochromic thin film layer having surface irregularities formed on that transparent thin film. A diffuse reflection type photochromic glass material includes the aforementioned diffuse reflection type photochromic element as a constituent unit. A method for manufacturing a diffuse reflection type photochromic unit includes the steps of forming a transparent thin film having surface irregularities integrally or separately on a transparent base and forming a reflective photochromic thin film layer having surface irregularities on that transparent thin film.

12 Claims, 8 Drawing Sheets

(a)

(b)

(a)

(b)

(a)

(b)

REFLECTIVE LIGHT CONTROL ELEMENT WITH DIFFUSIBLE REFLECTING SURFACE

BACKGROUND OF THE INVENTION

1. Field of the Invention

The present invention relates to a diffuse reflection type photochromic element, and relates more particularly to a diffuse reflection type photochromic element in which a transparent state and a diffusely reflective state which diffuses light can be controlled at will. In light of the fact that in the technical field of photochromic glass, in which as a photochromic material the trasmissivity of light of which can be reversibly altered, conventional photochromic glass has suffered from the problem of reflecting sunlight and the like too glaringly when in a clear mirror-like state for example, the present invention provides a novel diffuse reflection type photochromic element capable of providing a new diffuse reflection type photochromic glass which does not suffer from this problem. The present invention is useful in that it provides a novel diffuse reflection type photochromic material to be used in photochromic glass for automatically controlling sunlight entering through window glass without the use of blinds or curtains, a diffuse reflection type photochromic glass prepared using this material, a window material for controlling the transmittance of sunlight in buildings and the like.

2. Description of the Related Art

In buildings in general, windows (openings) are a major source of heat loss and gain. For example, the proportion of heat which escapes through the windows when a building is heated in the winter is about 48%, while the proportion of heat entering through the windows when a building is cooled in the summer is about 71%. Consequently, great energy-saving benefits can be obtained by successfully controlling light and heat at the windows. Photochromic glass was developed for this purpose and serves the function of controlling the gain and loss of heat and light.

There are various systems for performing light control of such photochromic glass. These include 1) materials the transmissivity of which is reversibly altered by application of current or voltage (called as electrochromic materials) and 2) materials the transmissivity of which is reversibly altered by controlling atmospheric gas (called as gasochromic materials). Of these, research is more advance in the field of electrochromic light control glass using a thin film of tungsten oxide for the light control layer, a technology which is almost at the practical stage, with products already on the market.

Known electrochromic light control glasses, including tungsten oxide glass, are all based on the principle of controlling light by absorbing light at the photochromic layer. In this case, the problem is that this kind of photochromic glass acquires heat when light is absorbed by the photochromic layer, and this heat is radiated back into the room, detracting from the energy-saving benefits. To avoid this problem, light needs to be controlled by reflecting it rather than by absorbing it. There is demand for materials which have the property of reversibly changing from a mirror state to a transparent state.

For a long time no such photochromic material could be found capable of reversibly changing from a mirror state to a transparent state, but in 1996 a Dutch group discovered that hydrides of rare earths such as yttrium and lanthanum could be switched from a mirror state to a transparent state by means of hydrogen, and such materials were named "switchable mirror" (J. N. Huiberts, R. Griessen, J. H. Rector, R. J. Wijngaarden, J. P. Dekker, D. G. de Groot and N. J. Koeman, Nature 380 (1996) 231). These rare earth hydrides vary greatly in transmissivity and have excellent switchable mirror properties. However, because rare earth elements are used as materials in these switchable mirrors, there are resource and cost problems when they are used as window coatings and the like.

Next, in 2001, a U.S. group discovered the magnesium-nickel alloy $Mg_2Ni$ as a new switchable mirror material (T. J. Richardson, J. L. Slack, R. D. Armitage, R. Kostecki, B. Farangis and M. D. Rubin, Appl. Phys. Lett. 78 (2001) 3047). The elements used in this material are magnesium and nickel, which are cheaper and easier to obtain than rare earth elements. Consequently, this material is expected to be better suited to window coatings. However, although this material is highly reflective when in a mirror state, its optical transmissivity in a transparent state is low (20% according to the literature), and this transmissivity would need to be improved in order for the material to be practical.

After work at improving the switchable mirror characteristics of this magnesium-nickel alloy thin film, the present inventors have discovered that a magnesium-rich magnesium-nickel alloy thin film has good switchable properties, and developed a switchable mirror glass using a magnesium-nickel alloy thin film (Japanese patent publication No. 2003-335553).

However, when this switchable mirror is used in a building, the problem is that if the mirror state is too clear, sunlight and the like will be reflected too glaringly. The recent trend has been to avoid the use in buildings of highly reflective glass which appears mirror-like. Sometimes called "light pollution," this problem of glass reflection is a problem in the architectural field.

SUMMARY OF THE INVENTION

Under these circumstances and in light of the related art described above, the present inventors have discovered as a result of exhaustive research aimed at developing a new means capable of resolving the aforementioned "light pollution" problem that if a diffusely reflecting surface was created on the surface so that light was scattered in the reflective state the glass would appear white in its reflective state and sunlight and the like would be scattered, thus reducing the problem of glare, and after further research they succeeded in perfecting the present invention.

It is an object of the present invention to provide a diffuse reflection type photochromic element capable of being used favorably in the window glass of buildings and the like, which allows reflected light to be scattered and glare to be eliminated in the metal state by means a switchable mirror thin film formed on a substrate having surface irregularities, in which form the light control film can be switched between a transparent state and a whitish diffusely reflective state.

Moreover, it is an object of the present invention to provide a novel diffuse reflection type photochromic glass wherein forming a switchable mirror thin film with surface irregularities allows the photochromic properties and deterioration properties to be improved over those of thin films formed on flat glass substrates.

To resolve the aforementioned problems, the present invention constitutes the following technical means.

(1) A diffuse reflection type photochromic element which comprises a transparent thin film having surface irregularities formed on a transparent base, and a reflective photochromic thin film layer having surface irregularities formed on that transparent thin film.

(2) The diffuse reflection type photochromic element according to (1) above, wherein said transparent base is a transparent plastic substrate or transparent sheet.

(3) The diffuse reflection type photochromic element according to (1) above, wherein said transparent thin film is a transparent conductive film.

(4) The diffuse reflection type photochromic element according to (3) above, wherein said transparent conductive film is at least one selected from tin oxide with added fluorine, tin oxide with added antimony, indium tin oxide with added antimony, or zinc oxide with added aluminum.

(5) The diffuse reflection type photochromic element according to (1) above, which has a function switchable between a transparent state and a state which reflects light, wherein 1) said reflective photochromic thin film layer comprises one of a magnesium-nickel alloy thin film, a magnesium thin film, a rare earth metal thin film, or an alloy thin film of rare earth metal and magnesium;

2) said reflective photochromic thin film layer has a catalytic layer formed on said thin film; and 3) said reflective photochromic thin film layer optionally has a protective layer formed on said catalytic layer.

(6) The diffuse reflection type photochromic element according to (5) above, wherein 0.5 to 10 nm of palladium or platinum, or a material containing either one or both of these is coated on the surface of said thin film as a catalytic layer.

(7) The diffuse reflection type photochromic element according to (5) above, wherein said protective layer is hydrogen permeable, and made of a non-water-permeable material.

(8) The diffuse reflection type photochromic element according to (1) above, wherein the light control properties and deterioration properties are improved by the formation on said reflective photochromic thin film layer of a surface configuration including multiple pyramidal projections extending in the opposite direction from the transparent base.

(9) The diffuse reflection type photochromic element according to (8) above, wherein said reflective photochromic thin film layer has a surface configuration including multiple pyramidal projections extending in the opposite direction from the transparent base, and the height of the projections exposed on the surface is 50 to 200 nm.

(10) A method for manufacturing a diffuse reflection type photochromic element comprising the steps of:

forming a transparent thin film having surface irregularities either integrally or separately on a transparent base; and forming a reflective photochromic thin film layer having surface irregularities on the transparent thin film.

(11) A structural member with a switchable mirror comprising a diffuse reflection type photochromic element defined in (1) above as a photochromic element.

(12) The structural member with a switchable mirror according to (11) above, wherein the switchable mirror is a photochromic glass for buildings.

Next, the present invention is explained in more detail.

The diffuse reflection type photochromic element of the present invention is characterized in that a transparent thin film having surface irregularities is formed on a transparent base and a reflective photochromic thin film layer having surface irregularities is formed on that transparent thin film. Fundamentally, the present invention relates to a diffuse reflection type photochromic element having the added function of controlling glare wherein a transparent thin film having surface irregularities of about 50 to 100 nm is laid on a glass, plastic or other transparent substrate as shown schematically in FIG. 1(a), and a reflective light control thin film such as Pd/Mg$_6$Ni or the like is deposited thereupon as shown schematically in FIG. 1(b) so that reflected light in the reflective state (metal state) is diffused and appears white.

In the present invention, a transparent conductive film for example is used as the transparent thin film having surface irregularities, and preferably a transparent conductive film used for solar battery substrates can be used for example. Providing the film surface with irregularities produces a light containment effect and can improve photoelectric transfer efficiency. The present invention makes it possible for example by applying this substrate to use an irregularly-shaped transparent thin film as a template to give similar surface irregularities to a reflective photochromic layer, but the present invention is not limited to this, and a substrate and thin film of an appropriate shape can be used.

FIG. 2(a) shows a scanning electron microscope (SEM) image of diffusive substrate (a) which is an F doped SnO$_2$ film with a thickness of 400 nm formed by atmospheric pressure chemical vapor deposition (APCVD) on a glass surface. This SnO$_2$ film formed of multiple pyramidal crystal grains, and the SnO$_2$ film surface has pyramidal projections 50 to 150 nm in height. FIG. 2(b) shows a scanning electron microscope (SEM) image of diffusely reflective photochromic thin film surface (b) which is an Mg$_6$Ni thin film about 40 nm thick formed by sputtering on this SnO$_2$ film with a Pd thin film about 4 nm thick also formed by sputtering thereupon. It can be seen that a form similar to that of FIG. 2(a) is basically retained even after formation of this reflective photochromic thin film, with surface irregularities present.

Favorable examples of transparent thin films having such surface irregularities include tin oxide with added fluorine, tin oxide with added antimony, indium tin oxide with added antimony, zinc oxide with added aluminum and the like, but these are not limitations and any with the same effects could be used in the same way. Not only are these thin films transparent, but since they are also electrically conductive these transparent conductive films act as electrodes when the reflective photochromic element is electrically switched (electrochromic system).

FIG. 3 is a photograph of the metal state of a sample consisting of a Pd/Mg$_6$Ni thin film formed as a reflective photochromic thin film on the aforementioned transparent conductive film of F doped SnO$_2$ film with surface irregularities coated on glass. Normally a Pd/Mg$_6$Ni thin film exhibits a clear reflection close to that of a silver mirror when coated on flat glass, but it can be seen that in the case of the Pd/Mg$_6$Ni thin film having surface irregularities the light is scattered by the surface irregularities, resulting in a whitish color.

Magnesium-nickel alloy thin films, magnesium thin films, rare earth metal thin films and alloy thin films of rare earth metals and magnesium can be used favorably as the reflective photochromic thin film layer, but these are not limitations. Of these, for purposes of application to large glass a magnesium-nickel alloy thin film (Mg$_x$Ni, 0<x<0.3) is the most desirable from the standpoint of cost and performance.

When this reflective photochromic thin film in a metal state is hydrogenated, it changes to a transparent state. A photograph of a Pd/Mg$_6$Ni thin film in this transparent state is shown in FIG. 4. The external appearance of this reflective photochromic thin film in a transparent state is virtually the same as that of a normal Pd/Mg$_6$Ni thin film coated on flat glass, showing that it is possible to switch a Pd/Mg$_6$Ni thin film provided with surface irregularities from a slightly yellowish transparent state to a diffusely reflective state which appears somewhat whitish.

In the present invention, the degree of diffusion of light in the reflective state can be controlled at will by altering the shapes of the surface irregularities in the transparent thin film which is the base. It is possible to make the reflective state whiter by increasing the proportion of surface irregularities, but increasing the proportion of irregularities too much imparts a cloudy white appearance even in the transparent state. In general there are two means of light control using this diffuse reflection type photochromic element. One is a gasochromic system using hydrogen gas and oxygen gas, and the other is an electrochromic system in which the flow of hydrogen ions is controlled electrically using an electrolyte.

When the diffuse reflection type photochromic element of the present invention is used in a gasochromic system, for example a double glass is formed with the side having the photochromic thin film on the inside, and light control is performed by making the space between the two an atmosphere containing hydrogen or an atmosphere containing oxygen. When the photochromic layer contacts an atmosphere containing hydrogen the metal is hydrogenated, changing the layer from a mirror state (reflective state) to a transparent state, while when it contacts an atmosphere containing oxygen dehydrogenation occurs, changing the layer to a reflective state.

When the diffuse reflection type photochromic element of the present invention is used in an electrochromic system, for example an electrolyte and counter electrode are provided above the photochromic thin film, and light control is performed by applying voltage between the underlying transparent conductive film and the counter electrode. When minus potential is applied to the reflective photochromic film side hydrogen ions in the electrolyte enter the metal film, which is hydrogenated and becomes transparent. However, when the photochromic film side and the counter electrode are short-circuited the hydrogen ions depart, the metal state is restored and light is reflected.

In the present invention, giving the reflective photochromic thin film an irregular shape serves not only to diffuse light but also to improve the photochromic properties and deterioration properties. For example, during light control in the gasochromic system hydrogen leaves and enters the surface of the photochromic thin film, and making the surface shape irregular increases the surface area, thus providing more places where hydrogen can leave and enter, so that hydrogenation and dehydrogenation occur more easily than in the case of a smooth surface. The same is true of the gain and loss of hydrogen ions from the electrolyte in the electrochromic system.

Moreover, deterioration occurs in a reflective photochromic element due to repeated hydrogenation and dehydrogenation, making hydrogenation and dehydrogenation gradually more and more difficult. For example, when a Pd/Mg$_6$Ni thin film formed on glass is repeatedly made transparent and then reflective using hydrogen gas and oxygen gas, light control gradually starts to fail after about 100 switches. By contrast, when the same light control operation is repeated with a Pd/Mg$_6$Ni thin film having surface irregularities the degree of deterioration is less. Looking at the surface shape after 100 repeated cycles, the smooth-surfaced Pd/Mg$_6$Ni thin film exhibits changes including cracks in the film and buildup on the craters, which are thought to be related to deterioration, while the Pd/Mg$_6$Ni film with surface irregularities exhibits no such changes, so it appears that deterioration can be controlled by giving the photochromic element a specific shape.

The diffuse reflection type photochromic element of the present invention can be used as diffuse reflection type photochromic glass when prepared using a glass base, and can be used in any product configuration depending on the choice of base. For example, when the diffuse reflection type photochromic glass of the present invention is used as a building window, when the photochromic glass is in a reflective state some of the light is diffused, producing a whitish color, so that glare is greatly reduced in comparison with conventional reflective photochromic elements in a clear mirror state, allowing favorable use as photochromic glass for buildings.

The following particular effects are provided by the present invention: (1) a diffuse reflection type photochromic element is provided having a diffusely reflective surface and capable of switching between a transparent state and a diffusely reflective whitish state, (2) because the diffuse reflection type photochromic element of the present invention diffuses light when in a metal state it is not glaring even in strong sunlight and is a photochromic glass suitable for buildings, and (3) making the surface shape irregular not only improves responsiveness to hydrogenation and dehydrogenation but also reduces deterioration from repeated cycles of use.

DESCRIPTION OF THE PREFERRED EMBODIMENTS

Next, the present invention is explained in detail based on examples, but the present invention is in no way limited by these examples.

EXAMPLE 1

First, an F doped $SnO_2$ film 400 nm thick was formed by atmospheric pressure chemical vapor deposition (APCVD) on a glass surface. A reflective photochromic thin film was then formed thereupon using a triple magnetron sputtering system. Metal magnesium, metal nickel and metal palladium were set as targets for the three sputter guns. Magnesium and nickel were first sputtered to form a magnesium thin film. The argon gas pressure during sputtering was 1.2 Pa, and 30 W of power was applied to the magnesium and 11 W to the nickel to form $Mg_6Ni$ by direct current sputtering. Next, 6 W of power was applied under the same vacuum conditions to deposit a palladium thin film.

Figure 1:
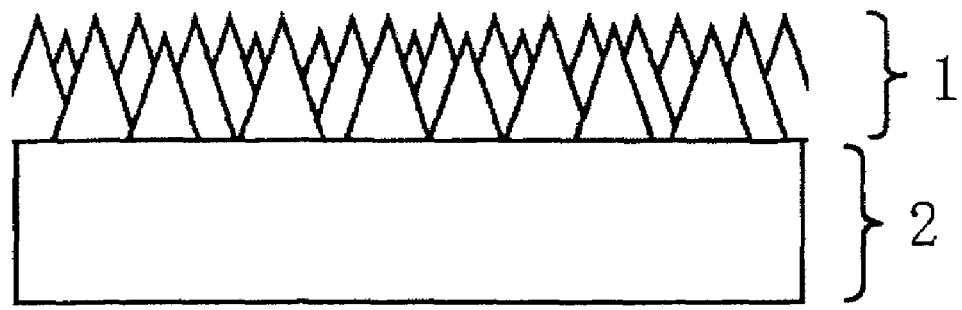
FIG. 1 shows a schematic diagram of (a) a transparent thin film with surface irregularities/transparent base and (b) a diffuse reflection type photochromic element, 1: transparent thin film, 2: transparent base, 3: Reflective photochromic thin film (Pd/Mg$_6$Ni)
Figure 1:
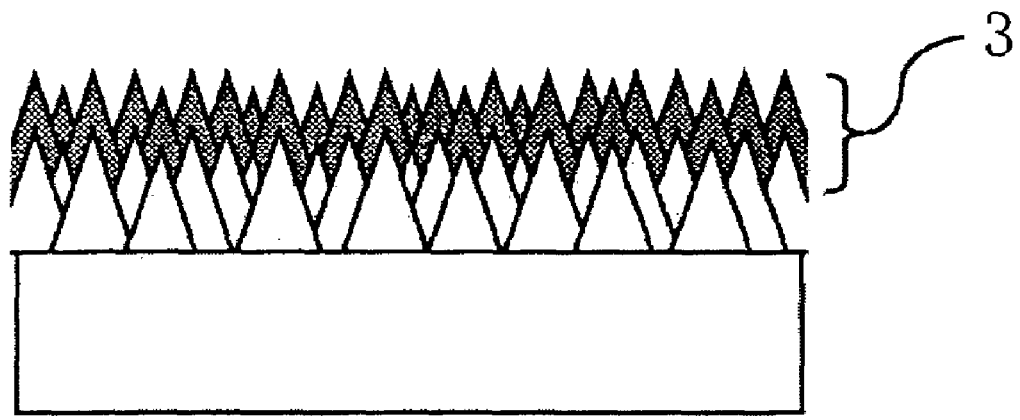
Figure 2:
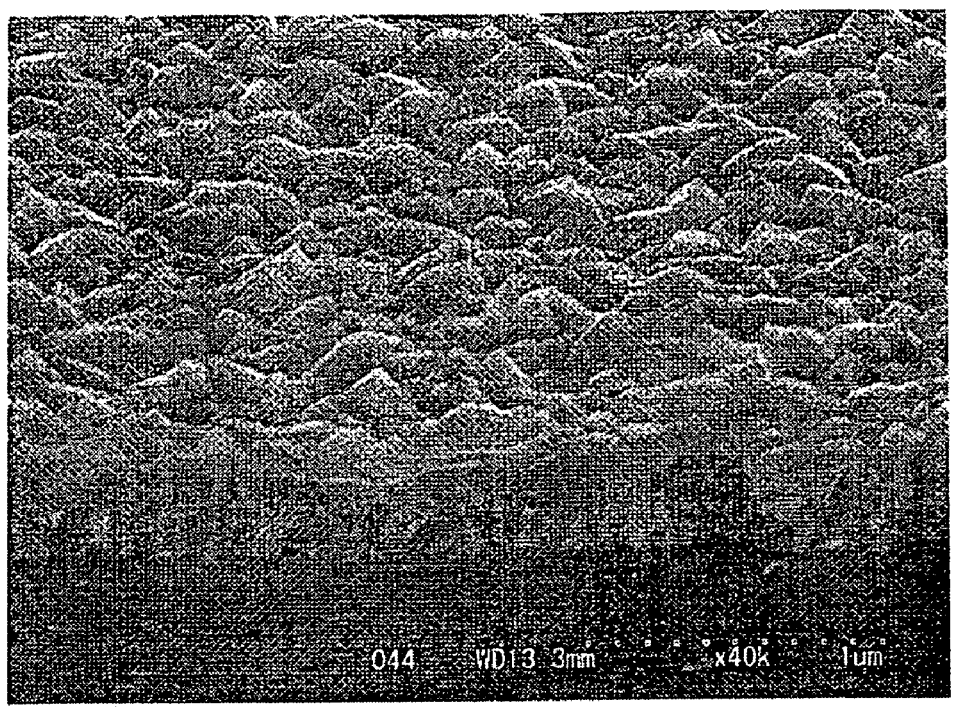
FIG. 2 shows scanning electron microscope images of (a) a diffusive substrate and (b) a diffusely reflective photochromic thin film surface.
Figure 2:
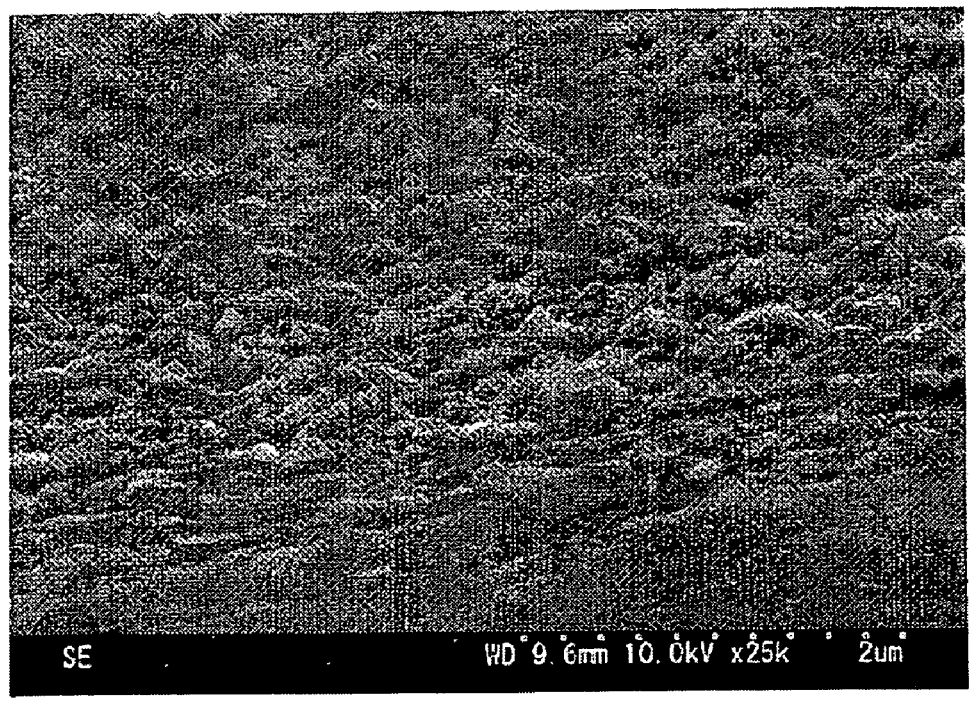
Figure 3:
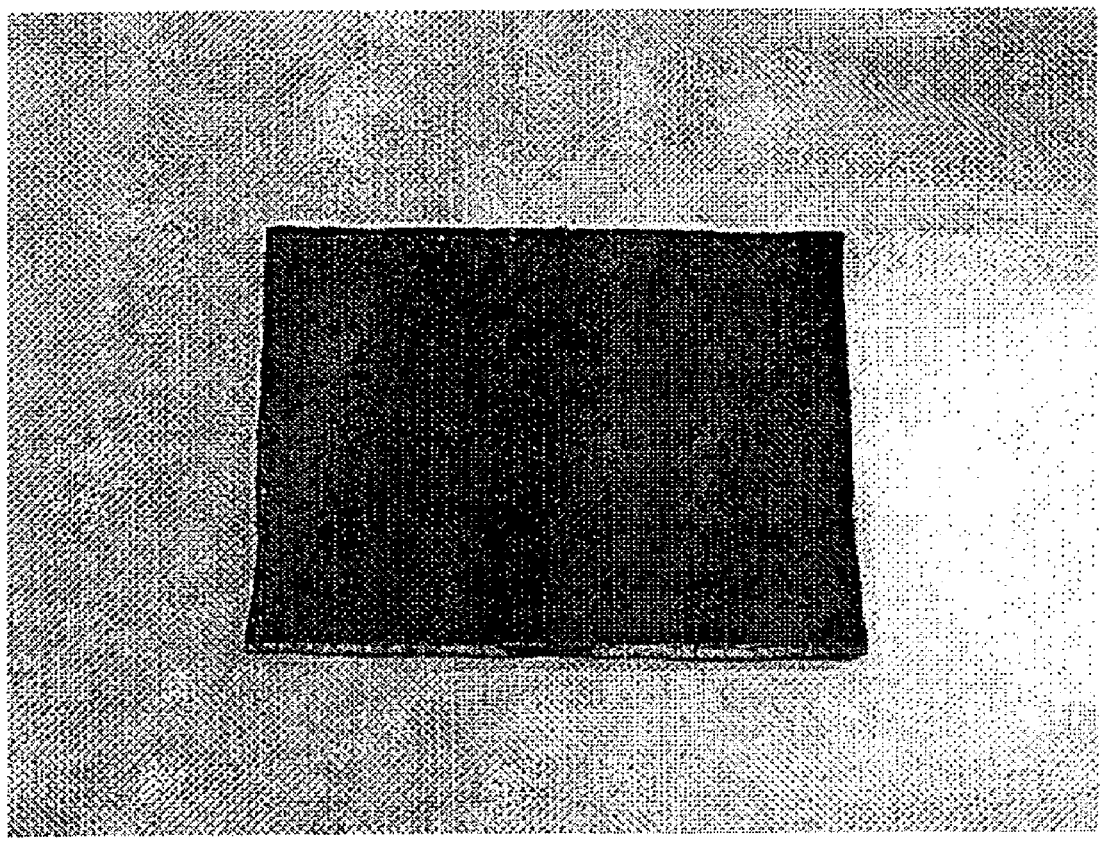
FIG. 3 shows an external view of a diffuse reflection type photochromic element (metal state)

The results of scanning electron microscopy (SEM) of the surface of the resulting diffuse reflection type photochromic thin film are shown in FIG. 2(b). It can be seen that the surface shape of the $Pd/Mg_6Ni$ thin film is irregular. FIG. 3 is a photograph of the outside of this sample. The thin film is in a metal state, but light is diffused by the irregular surface shape and a whitish color is exhibited.

EXAMPLE 2

Figure 4:
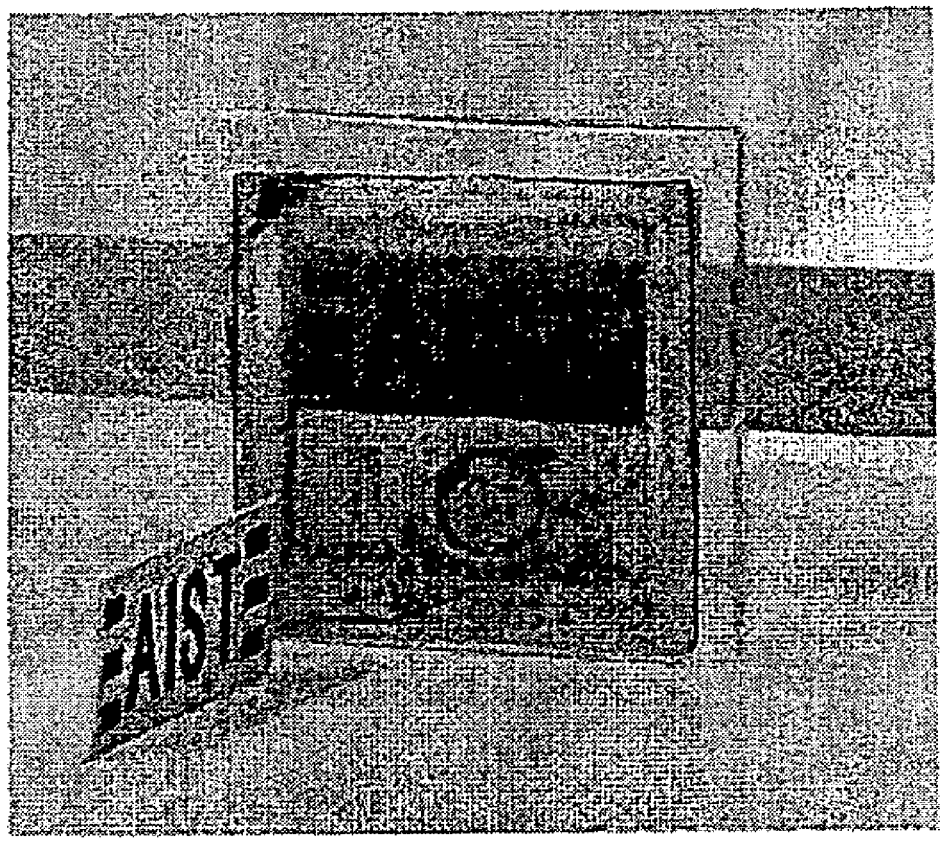
FIG. 4 shows an external view of a diffuse reflection type photochromic element (transparent state)

In a double glass configuration with the deposited surface of this sample on the inside facing another sheet of glass with a spacer in between, hydrogen gas diluted to 1% with argon was blown into the intervening space to change the thin film from a metal state to a transparent state. The outside appearance of this transparent state is shown in FIG. 4. As shown in this photograph, there is little effect of the surface irregularities in the transparent state, which is similar to that of a film deposited on smooth glass.

Figure 5:
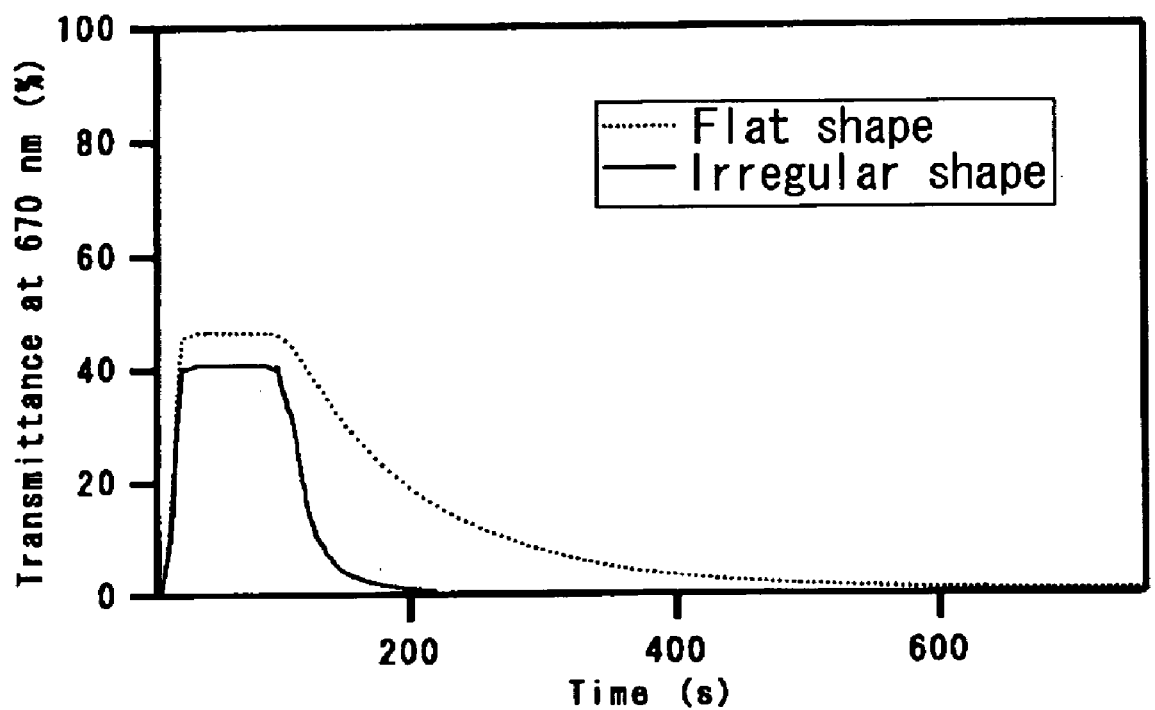
FIG. 5 shows changes in the optical transmissivity of Pd/Mg$_6$Ni at a wavelength of 670 nm in a gasochromic system (dotted line on flat glass substrate, solid line with surface irregularities)

Changes over time in optical transmittance during light control using this glass are shown in FIG. 5. When exposed to an atmosphere containing hydrogen, the thin film becomes transparent and transmittance rises due to hydrogenation within about 10 seconds. Once the input of hydrogen gas is stopped, the hydrogen is removed by the effect of air (oxygen) and the original state returns in about a minute. The results of measurements done under the same conditions with a $Pd/Mg_6Ni$ film prepared under the same conditions on normal glass are shown with a solid line. By comparison, when the surface has an irregular shape the speed of hydrogenation is about the same as it is when the surface is flat, but the speed of dehydrogenation is much faster. This is thought to be an effect of increased surface area due to the irregular shape of the surface.

EXAMPLE 3

Looking at changes in transmissivity in a reflective state and transmissivity in a transparent state when a magnesium-nickel alloy thin film and palladium were deposited on normal glass and hydrogenation and dehydrogenation (switching from transparent to mirror state) were repeated, the range within which light control was possible gradually narrowed with repeated hydrogenation and dehydrogenation, and deterioration was rapid after 100 cycles. SEM observation of the surface of this $PD/Mg_6Ni$ thin film after 100 cycles showed cracks on the surface and buildup on the craters, which are thought to be the source of deterioration.

Figure 6:
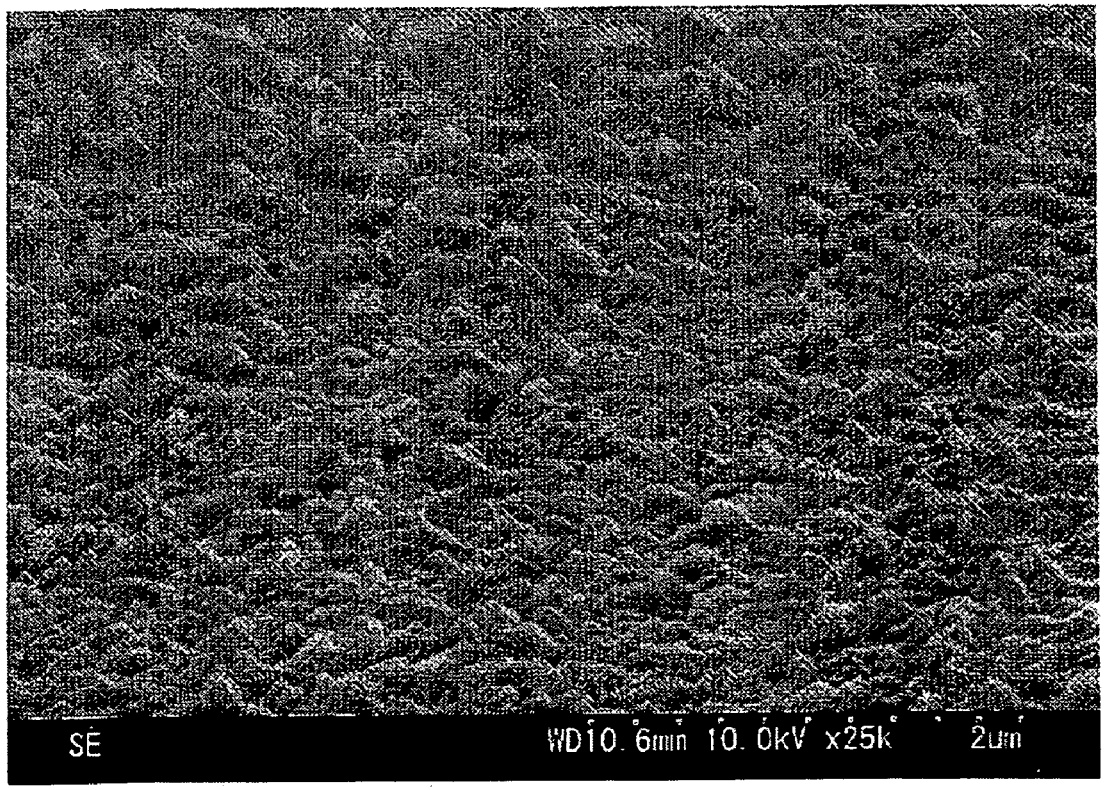
FIG. 6 shows a scanning electron microscope image of a diffuse reflective photochromic thin film surface after 100 cycles of use.

By contrast, looking at the transmissivity in a reflective state and transmissivity in a transparent state when a $Pd/Mg_6Ni$ thin film prepared with surface irregularities under the same conditions as in Example 1 was subjected to the same repeated hydrogenation and dehydrogenation, there was less deterioration due to repeated cycles than in the case of the smooth surface, showing that deterioration is less likely. FIG. 6 is an SEM image of the surface after 100 cycles. Compared to the state before cycle repetition as shown in FIG. 2(b), the grains are seen to be somewhat smaller. However, there is no cracking or buildup on the craters as in the case of the smooth surface, and less change in the surface state, which can be attributed to a reduction in deterioration.

Figure 7:
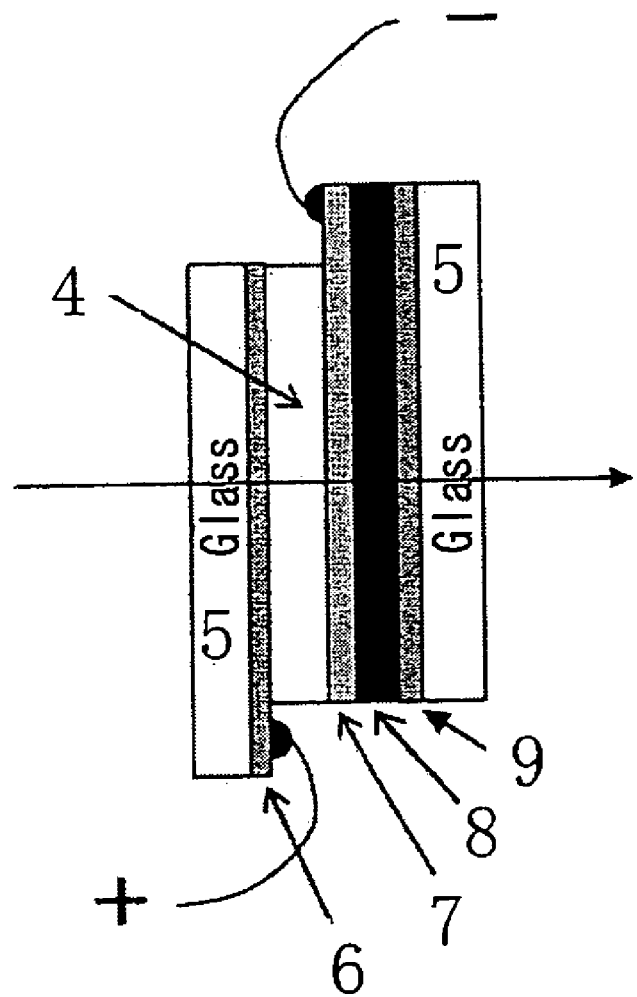
FIG. 7 shows a schematic view of a diffuse reflection type photochromic element to be performed by an electrochromic system, 4: Electrolyte, 5: Glass, 6: Transparent conductive film (ITO), 7: Pd thin film, 8: Mg—Ni alloy thin film, 9: Irregularly-shaped transparent conductive film.
Figure 8:
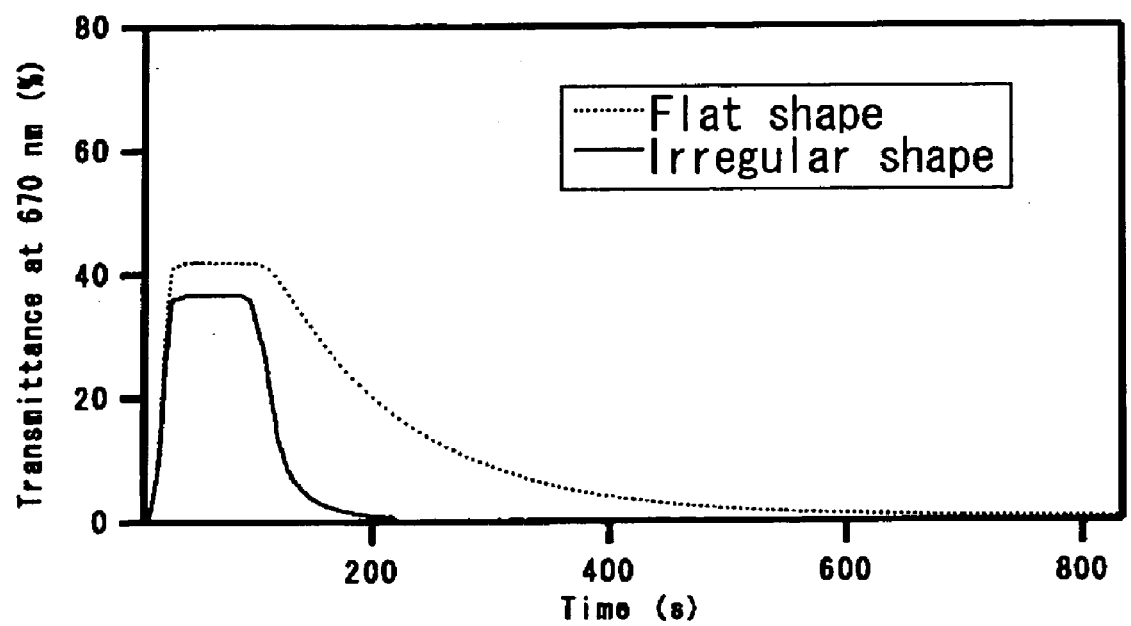
FIG. 8 shows changes in optical transmissivity of Pd/Mg$_6$Ni at a wavelength of 670 nm in an electrochromic system (dotted line on flat glass substrate, solid line with surface irregularities).

This diffuse reflection type photochromic element can also be made to be switched electrically (electrochromic system). In this case, an element is configured using an electrolyte as shown in FIG. 7. Changes in transmissivity when voltage was applied to this cell are shown plotted in FIG. 8. The properties of a $Pd/Mg_6Ni$ thin film formed on a transparent conductive film with few surface irregularities are shown for purposes of comparison. When plus voltage is applied to the photochromic thin film side it switches from a mirror state to a transparent state, while when short-circuited it switches to a mirror state. Comparing responsiveness, as in the gasochromic system, the response was faster when switching from a transparent to a mirror state when the $Pd/Mg_6Ni$ thin film was formed with surface irregularities. This is also attributable to easier gain and loss of hydrogen ions due to the irregular shape.

As explained above, the present invention relates to a reflective photochromic element having a diffusely reflective surface, and a diffuse reflection type photochromic element having a diffusely reflective surface and capable of switching from a transparent state to a diffusely reflective whitish state can be provided by the present invention. Because the diffuse reflection type photochromic element of the present invention diffuses light when in a metal state, it does not glare even in strong sunlight and is a suitable photochromic glass for buildings and the like. Moreover, giving the surface an irregular shape not only improves responsiveness to hydrogenation and dehydrogenation, but also reduces deterioration from repeated cycles of use. The present invention is useful in that it provides a novel diffuse reflection type photochromic element with improved photochromic and deterioration properties and applied products using this element, and contributes to the creation of novel technologies and industries in this technical field.

What is claimed is:

1. A diffuse reflection type photochromic element which comprises a transparent thin film having surface irregularities formed on a transparent base, and a reflective photochromic thin film layer having surface irregularities formed on that transparent thin film.

2. The diffuse reflection type photochromic element according to claim 1, wherein said transparent base is a transparent plastic substrate or transparent sheet.

3. The diffuse reflection type photochromic element according to claim 1, wherein said transparent thin film is a transparent conductive film.

4. The diffuse reflection type photochromic element according to claim 3, wherein said transparent conductive film is at least one selected from tin oxide with added fluorine, tin oxide with added antimony, indium tin oxide with added antimony, or zinc oxide with added aluminum.

5. The diffuse reflection type photochromic element according to claim 1, which has a function switchable between a transparent state and a state which reflects light, wherein (1) said reflective photochromic thin film layer comprises one of a magnesium-nickel alloy thin film, a magnesium thin film, a rare earth metal thin film, or an alloy thin film of rare earth metal and magnesium;

(2) said reflective photochromic thin film layer has a catalytic layer formed on said thin film; and (3) said reflective photochromic thin film layer optionally has a protective layer formed on said catalytic layer.

6. The diffuse reflection type photochromic element according to claim 5, wherein 0.5 to 10 nm of palladium or platinum, or a material containing either one or both of these is coated on the surface of said thin film as a catalytic layer.

7. The diffuse reflection type photochromic element according to claim 5, wherein said protective layer is hydrogen permeable, and made of a non-water-permeable material.

8. The diffuse reflection type photochromic element according to claim 1, wherein the light control properties and deterioration properties are improved by the formation on said reflective photochromic thin film layer of a surface configuration including multiple pyramidal projections extending in the opposite direction from the transparent base.

9. The diffuse reflection type photochromic element according to claim 8, wherein said reflective photochromic thin film layer has a surface configuration including multiple pyramidal projections extending in the opposite direction from the transparent base, and the height of the projections exposed on the surface is 50 to 200 nm.

10. A method for manufacturing a diffuse reflection type photochromic element comprising the steps of:

forming a transparent thin film having surface irregularities either integrally or separately on a transparent base; and forming a reflective photochromic thin film layer having surface irregularities on the transparent thin film.

11. A structural member with a switchable mirror comprising a diffuse reflection type photochromic element defined in claim 1 as a photochromic element.

12. The structural member with a switchable mirror according to claim 11, wherein the switchable mirror is a photochromic glass for buildings.

* * * * *